(12) United States Patent
Thery et al.

(10) Patent No.: US 10,891,878 B2
(45) Date of Patent: Jan. 12, 2021

(54) TRACKING SYSTEM FOR WEB-BASED ARTICLES

(71) Applicant: 3M INNOVATIVE PROPERTIES COMPANY, St. Paul, MN (US)

(72) Inventors: Ronald K. Thery, New Brighton, MN (US); Shawn P. Crosby, Minneapolis, MN (US); George G. Gentes, Lakeland, MN (US); Rebecca C. Lee, Eagan, MN (US); Timothy W. Thornton, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/761,459

(22) PCT Filed: Sep. 29, 2016

(86) PCT No.: PCT/US2016/054374
§ 371 (c)(1),
(2) Date: Mar. 20, 2018

(87) PCT Pub. No.: WO2017/059030
PCT Pub. Date: Apr. 6, 2017

(65) Prior Publication Data
US 2018/0342182 A1  Nov. 29, 2018

Related U.S. Application Data

(60) Provisional application No. 62/235,040, filed on Sep. 30, 2015.

(51) Int. Cl.
G06F 3/00 (2006.01)
G09F 3/00 (2006.01)
G06K 7/14 (2006.01)

(52) U.S. Cl.
CPC ............ *G09F 3/0297* (2013.01); *G06F 3/002* (2013.01); *G06K 7/1404* (2013.01)

(58) Field of Classification Search
CPC ............. G06K 19/06; G06K 19/06009; G06K 19/06018; G06K 19/06028;
(Continued)

(56) References Cited

U.S. PATENT DOCUMENTS

| 4,068,028 A * | 1/1978 | Samonides | G09F 3/10 428/41.4 |
| 4,716,052 A * | 12/1987 | Waugh | G09F 3/02 427/147 |

(Continued)

FOREIGN PATENT DOCUMENTS

| CN | 101792982 | 12/2011 |
| DE | 102008008231 | 8/2009 |
| WO | WO 2011/146603 | 11/2011 |

OTHER PUBLICATIONS

International Search report for PCT International Application No. PCT/US2016/054374 dated Dec. 2, 2016, 3 pages.

*Primary Examiner* — Thien M Le
*Assistant Examiner* — April A Taylor
(74) *Attorney, Agent, or Firm* — Jonathan L. Tolstedt

(57) ABSTRACT

The present disclosure relates in general to methods for tracking web-based articles and methods of authenticating the origin of web-based articles. Other aspects of the present disclosure relate to a tracking system for web-based articles and to web-based articles having identifying marks that allow tracking and authentication of its origin.

15 Claims, 3 Drawing Sheets

(58) Field of Classification Search
CPC ........ G06K 19/06046; G06K 19/06093; G09F 3/0297; G09F 3/0298; G09F 3/04; G09F 3/10
See application file for complete search history.

(56) References Cited

U.S. PATENT DOCUMENTS

| | | | | |
|---|---|---|---|---|
| 5,676,785 | A | * | 10/1997 | Samonides ............ B31D 1/021 156/244.11 |
| 5,768,384 | A | | 6/1998 | Berson |
| 5,863,076 | A | * | 1/1999 | Warther ................ B42D 5/027 283/105 |
| 5,974,150 | A | | 10/1999 | Kaish |
| 6,994,262 | B1 | * | 2/2006 | Warther ........... G06K 19/06018 235/492 |
| 8,622,434 | B1 | * | 1/2014 | Warther ................ B42D 5/027 283/74 |
| 2003/0034645 | A1 | * | 2/2003 | Dronzek, Jr. ............. B32B 7/12 283/81 |
| 2009/0116753 | A1 | | 5/2009 | Midgley |
| 2010/0014122 | A1 | | 1/2010 | Massicot |
| 2010/0200649 | A1 | | 8/2010 | Callegari |
| 2010/0219099 | A1 | * | 9/2010 | Schmitt ................ B65D 75/305 206/776 |
| 2012/0040113 | A1 | * | 2/2012 | Sato ...................... G09F 3/0297 428/34.1 |
| 2015/0154489 | A1 | * | 6/2015 | Dancausse ....... G06K 19/07758 235/488 |

\* cited by examiner

TRACKING SYSTEM FOR WEB-BASED ARTICLES

CROSS REFERENCE TO RELATED APPLICATIONS

This application is a national stage filing under 35 U.S.C. 371 of PCT/US2016/054374 filed Sep. 29, 2016, which claims the benefit of U.S. Provisional Application No. 62/235,040, filed Sep. 30, 2015, the disclosure of which is incorporated by reference in its/their entirety herein.

The present disclosure relates in general to methods for tracking web-based articles and methods of authenticating the origin of web-based articles. Other aspects of the present disclosure relate to a tracking system for web-based articles and to web-based articles having identifying marks that allow tracking and authentication of its origin.

BACKGROUND

Counterfeiting is a growing problem for companies in various industries. Recent estimates suggest the projected value of global trade in counterfeit and pirated goods in 2015 will be $1.7 trillion worldwide. The counterfeiting problem has become even more serious since the introduction of inexpensive, high quality color copiers, printers and scanners. Those devices, available only recently at relatively inexpensive prices, enable counterfeiters to reproduce the packaging and authentication features of many products.

Companies with highly respected and well-known brands and products are often subject to attempted counterfeiting. A number of security features have been developed to help authenticate consumer goods, thus assisting in preventing counterfeiters from creating imitations of products of value. Some of these security features may include overt security features or covert security features and their application and use depends on the type of article being protected. Overt security features are features that are easily viewable to the unaided eye, such features may include holograms and other diffractive optically variable images, embossed images, and color-shifting films. In contrast, covert security features include images only visible under certain conditions, such as inspection under light of a certain wavelength, polarized light, or retroreflected light.

Counterfeited automotive window film is a growing problem globally for window film manufacturers. Although the commercial success of available security features has been impressive for certain consumer goods, their use in window film has been constrained, and limited in success, by the nature of the automotive window film business and by the inherent limitations of the properties and handling of the window film itself. Thus, there is a current need to provide novel methods and systems suitable to deter counterfeiting of window film and other web-based articles.

SUMMARY

In one embodiment, the present disclosure is directed to web-based articles that have a plurality of identifying marks, which can be divided into other smaller articles, wherein the identifying marks allow both tracking of the articles as well as authentication of their source of origin. In some embodiments, the identifying marks can be printed on a liner of the web-based article, and the liner can be removed at the time the web-based article is being installed or used according to its intended purpose. In other embodiments, the identifying marks are printed directly on the outermost layer of the web-based article, opposite the liner.

In certain embodiments, identifying marks are placed not only on the web-based article, but also on other items, such as the core of the roll containing the web-based article, the packaging box where the web-based article was shipped, and the pallet where the web-based article was shipped. In those embodiments, the identifying marks of the different components are all associated with each other and can be linked to information contained in a database, such as date of manufacture of the web-based article, location of manufacture of the web-based article, lot number for the web-based article, packaging and shipping information for the web-based article, invoice information, etc. As the different items are being scanned at different locations along the entire distribution process from manufacture to the ultimate consumer, it will be possible to track the web-based article with increasing levels of detail. Moreover, to the extent there are price differentials in different distribution channels and locations for the same type of web-based article, it will also be possible to track and eliminate gray market goods intended for a given geographical market but actually sold in a different location.

In general, the identifying marks in the web-based articles described herein can be scanned with commercially available scanners or with smart phones and tablets. If a user employs a smart phone or a tablet, the identifying marks can be scanned using commercially available software ("apps") for each operating system, or can be scanned using customized apps designed to have different features for different users. For example, an employee of the company who manufactures the web-based article may be able to access information regarding manufacturing facility, lot number, etc. of the roll associated with the web-based article, whereas the ultimate consumer may have access to authenticating screens (or websites), warranty information and enrollment, or marketing information regarding the product or other related products. In some embodiments, the distributor or installer may be able to scan an identifying mark on the web-based article within a roll and be able to know how much material is left in the roll.

Additional embodiments will be described in the Detailed Description section and in the claims.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "parent film" as used herein and in the claims refers to any web-based article. The parent film may be coextruded or produced by laminating two or more separate layers, or by a combination of coextrusion and lamination. A characteristic of a parent film is that it can be subdivided into one or more smaller portions of film (web-based article). Examples of a parent film include, but are not limited to window films, non-woven fiber webs, tapes, multilayer composite films, etc.

The term "identifying mark" as used herein and in the claims refers to any code or series of codes that can be read with a scanning device.

The term "child film" as used herein and in the claims refers to a portion of a parent film that has been subdivided into at least one smaller portion. Once separated from the parent film, each child film can become a parent film, which can be subsequently subdivided into other child films.

LIST OF ELEMENTS IN THE FIGURES

Figure 1:
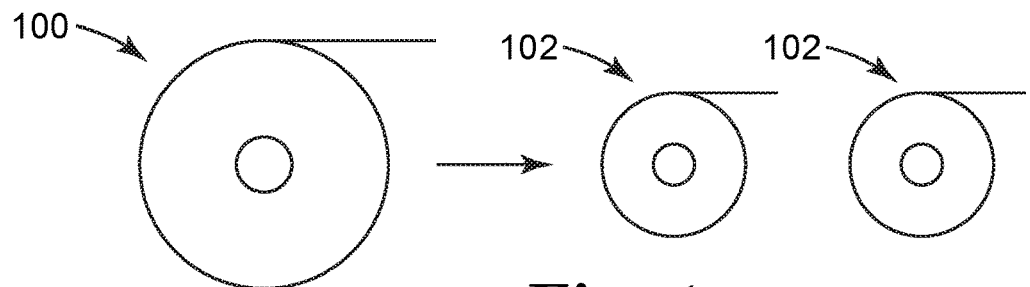
FIG. 1 depicts how a bulk long roll (100, e.g., a 100-ft long roll) may be divided into smaller rolls (102, e.g., 50-ft long rolls).

100—long roll.
102—shorter roll.
200—wide roll.
202—narrower roll.

DETAILED DESCRIPTION

In one embodiment, the present disclosure is directed to a parent film comprising:
one or more layers, and
a plurality of identifying marks,
wherein the parent film has a width and length,
wherein each of the plurality of identifying marks are different from each other,
wherein the identifying marks are located on the parent film across the width of the parent film and across the length of the parent film, and
wherein the parent film can be subdivided into one or more child films, each having a smaller surface area than the parent film.

In certain embodiments, each identifying mark in the parent film is associated with information stored in a database capable of uniquely identifying the child film containing the identifying mark. In other embodiments, the information stored in the database comprises information chosen from: date of manufacture of the parent film, location of manufacture of the parent film, lot number for the parent film, packaging and shipping information for the parent film (including information identifying the core of the roll containing the parent film, the packaging box where the parent film was shipped, and the pallet where the parent film was shipped), invoice information, and combinations thereof. In some embodiments, at least one of the identifying marks on the parent film has a parent-child relationship with identifying markings on the film roll cores, boxes, and pallets.

In certain embodiments, each of the identifying marks is chosen from 1-D data matrix codes and 2-D data matrix codes. In other embodiments, each of the identifying marks is a rectangular or a square data matrix code.

In another embodiment, the present disclosure is directed to a tracking system that comprises:
a parent film comprising:
one or more layers,
a plurality of identifying marks,
wherein the parent film has a width and length,
wherein each of the plurality of identifying marks are different from each other,
wherein the identifying marks are located on the parent film across the width of the parent film and across the length of the parent film, and
wherein the parent film can be subdivided into one or more child films, each having a smaller surface area than the parent film, and
a database comprising stored information on each of the plurality of identifying marks,
wherein the stored information for each identifying mark is sufficient to uniquely identify each child film on which the identifying mark is located,
wherein the stored information for each identifying mark is sufficient to associate each child film with the parent film.

In yet other embodiments, the present disclosure is directed to a method for authenticating a film comprising:
providing a parent film,
wherein the parent film comprises:
one or more layers,
a plurality of identifying marks,
wherein the parent film has a width and length, wherein each of the plurality of identifying marks are different from each other,
wherein the identifying marks are located on the parent film across the width of the parent film and across the length of the parent film,
wherein the parent film is subdivided into one or more child films, each having a smaller surface area than the parent film, and
wherein the child film has at least one identifying mark.
providing a database,
wherein the database comprises stored information on a plurality of authentic identifying marks,
wherein the stored information for each identifying mark is sufficient to uniquely identify a child film on which the identifying mark is located, wherein the stored information for each identifying mark is sufficient to associate a child film with its parent film, and verify that one or more identifying marks on the child film is an authentic identifying mark.

In certain embodiments, a parent film may be divided into several child films. For example, a typical 2000 yard jumbo may be converted into 100 foot rolls at the primary manufacturing location. A bulk roll may also be referred to as a "jumbo roll". A distributor may further cut each of these 100 foot rolls down to two 50 foot rolls for sale to the dealers. See, for example, FIG. 1.

Figure 2:
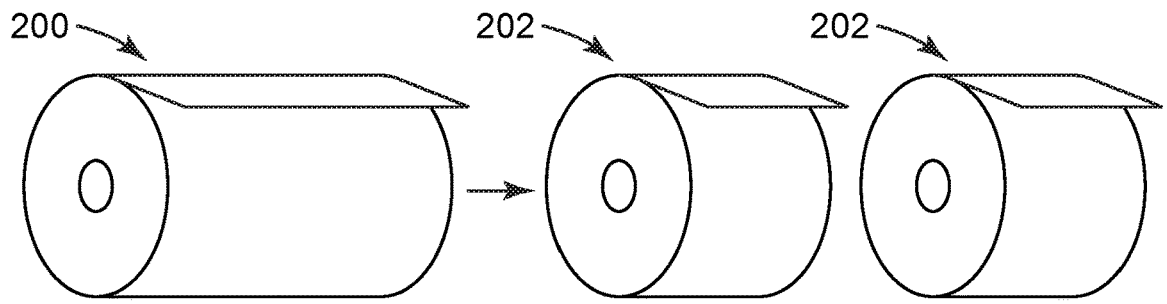
FIG. 2 depicts how a wide roll (200, e.g., 60-inch wide roll) may be divided into two narrower rolls (202, e.g., two 30-inch wide rolls).

Typical widths for web-based articles, such as window film are 72 inches and 60 inches. The same 60 inch wide roll may also be converted down to two 30 inch wide rolls either at the primary manufacturing location or at the distributor. See, for example, FIG. 2.

In some cases, the distributor may convert a 60 inch wide 100 foot long roll down into 30 inch wide, 50 foot rolls. There are multiple possible combinations of widths and lengths that the rolls may be cut down to along the distribution channel before sending to the final customer.

The identifying marks are arranged so that after slitting and dividing the bulk roll, all subsequent roll sections contain at least one unique identifying mark. The identifying marks can be printed on the parent film in one or more lanes along the machine direction. In one embodiment, the identifying mark are printed in three lanes oriented with the machine axis of the bulk roll. In another embodiment, the identifying marks measure about 0.25 by 0.50 inches. In other embodiments, the identifying marks are printed at regular interval in their respective lanes, such as for example 54 inches apart, 36 inches apart, 20 inches apart, or 12 inches apart. In some embodiments, the identifying marks are printed in a range from 10-30 inches apart, or from 20-40 inches apart, or from 40-60 inches apart.

In a typical embodiment, the identifying mark on the pallet load ticket is linked to each identifying mark on the labels of the boxes on the pallet and each identifying mark on a box label is also linked to the identifying mark on the pallet ticket. Furthermore, the identifying marks on each roll of film are linked to the respective core, box, and pallet identifying marks.

A typical automobile has between 3 to 9 windows where window film will be applied to. The dealers typically cut the roll of film into suitable shapes to match the windows during installation. The identifying marks on the parent film are spaced to ensure that at least one code is associated with every automobile. However, it is possible to increase the density of the codes to ensure that there are enough codes on the web to enable at least one code to be on every cut part.

Figure 3:
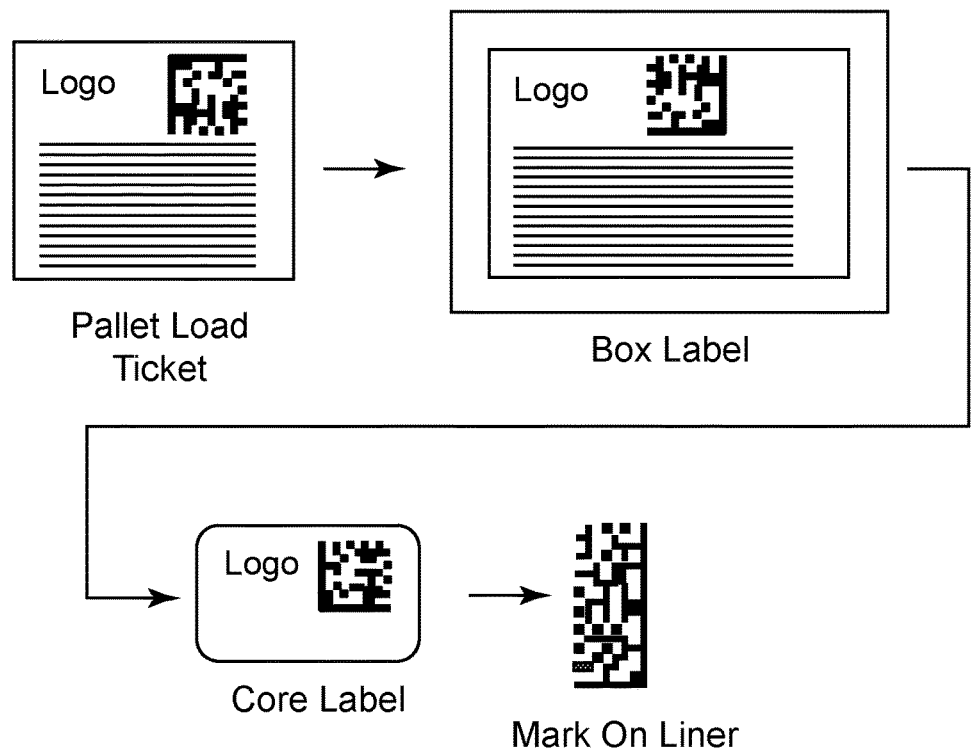
FIG. 3 shows examples of codes and labels that can be used in the systems described herein.

As shown in FIG. 3, a hierarchical system is created that can be scanned at all stages of the manufacturing and distribution process, from the factory floor to the distribution center, from the distribution center to the film installer, and from the installer to the purchaser.

By scanning any two elements in the hierarchy, discrepancies can be identified. For example, if the mark on the release liner of a film roll and the mark on the core used for the film roll were scanned and found to be improperly linked, it would indicate a problem, such as an attempt to counterfeit the product using discarded (or copied) release liners and cores.

Because the identifying marks are linked, other questions can be addressed. For example, the identifying marks on two boxes could be scanned to see if they were part of the same pallet load. By combining the information provided by the identifying marks with shipping data and the location of the scanning device, it can be determined if product has been diverted from its intended destination, thus providing an alert to possible "gray market" sales.

An app on a mobile device such as a smart phone or table can be used to scan the identifying marks. An authorized person can sign into a program specific app or a website to obtain additional information from the identifying marks. This information may include:

1. Product authentication
2. Production identification including part number and part description
3. Manufacturing run information such as manufacturing order number, batch number and crew.
4. Manufacturing location
5. Manufacturing date
6. Trace history showing all locations and dates the identifying mark has been scanned
7. Identifying mark location on the roll
8. Customer order information including name and location of intended recipient
9. All associated parent or child marks In some embodiments, the system is set up such that authorized access to the additional data can be parsed out to different groups. For example, a business analyst may have full access to all of the data, but a dealer may only see the name of the product, authentication of the product, and the amount of film remaining on the roll. A customer that has no additional access will only see the name and authentication of the product, but will additionally be directed to the product website. Under this concept, a $3^{rd}$ party can be granted access to the data to provide authentication to government entities or to participate or assist in quick and effective enforcement.

Reports can be created based on established business rules related to the identifying marks. These reports can provide information such as:

1. Notification that a single identifying mark has been scanned more than a preset number of times, thus providing indications that a mark may have been duplicated.
2. Notification that a single identifying mark has been scanned in a location different than the intended customer location.
3. Notification that a single identifying mark has been scanned in more than one country.
4. Point of Sale data showing where the final product ends up.
5. Supply chain data indicating number of rolls at each location.
6. A hierarchal listing of all parent and child marks for an aggregated shipment, customer order, manufacturing run, or other.

Additionally, the information stored in the identifying marks can be used to tie into other systems such as an electronic warranty system.

Exemplary Embodiments

In certain embodiments, film products designed to be attached to windows for use in automotive, architectural, solar control, and safety applications are printed with unique identifying marks using continuous inkjet (CIJ), piezo inkjet (PIJ), thermal transfer overlay (TTO), or thermal inkjet (TIJ) methods on either the top film surface or the backside release liner side of the film (or both) during the manufacturing process.

Figure 5:
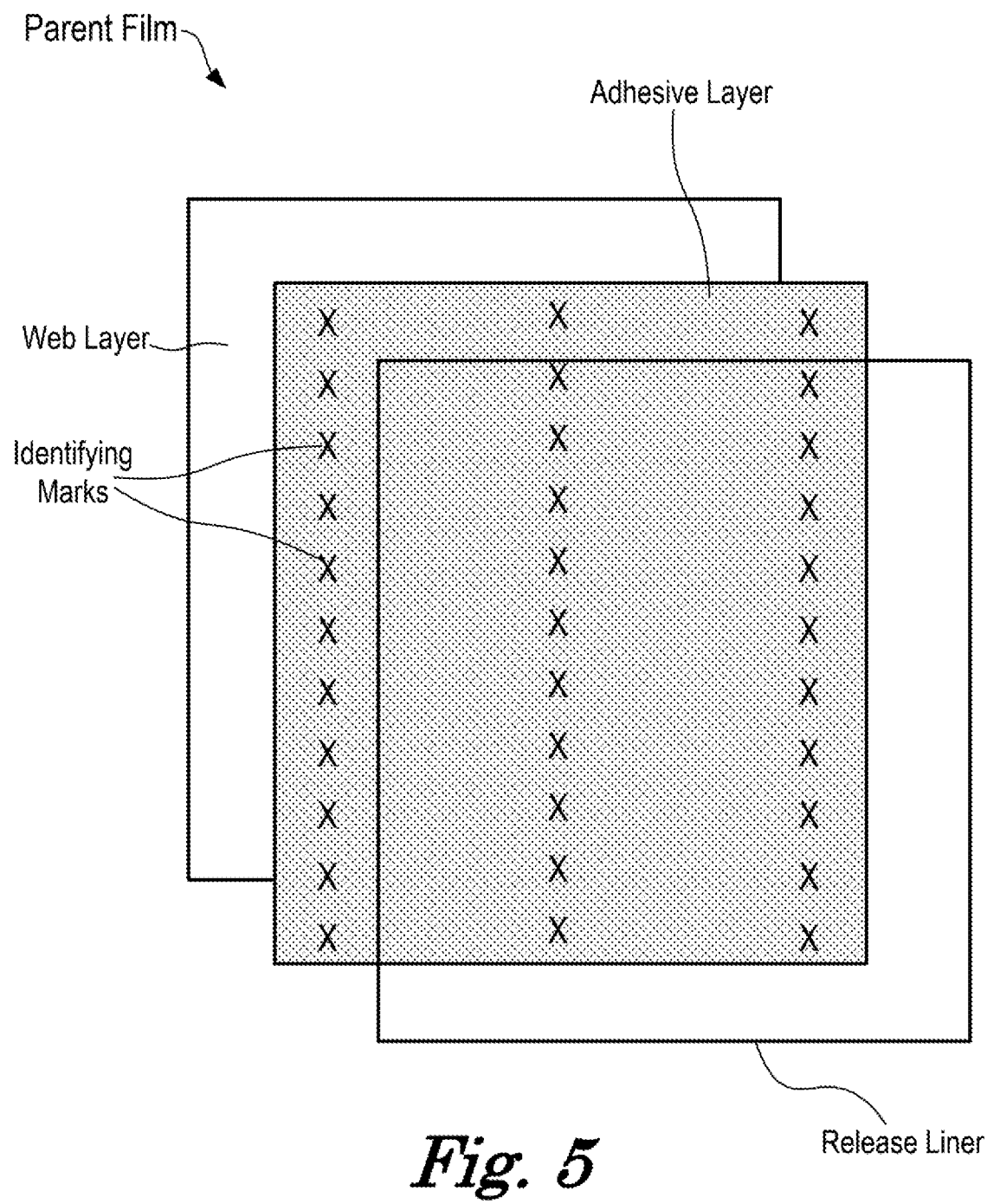
FIG. 5 is an illustration of the layers of a film in accordance with an embodiment described herein.

In one embodiment, as shown in FIG. 5, identifying marks comprising 2-D data matrix codes are printed on a layer of pressure-sensitive adhesive (PSA) coated onto a web layer, such as a polyethylene terephthalate (PET) film web. In other embodiments, a release liner is applied over the printed PSA layer. The identifying marks can be scanned through the release liner.

In certain embodiments, examples of identifying marks are created in the form of 2-D data matrix codes in either a square or rectangular configuration with a matrix configuration sufficient to contain the desired information. Embodied matrix sizes include 6×16, 16×16, 9×9, 16×24, 24×24 matrices.

Other identifying marks may be designed and printed incorporating a rectangular 2-D data matrix code into a logotype design, or logo. In other embodiments, an identifying mark can be designed such that a trademark or logo can be placed inside a rectangular (or square) 2-D data matrix code. Alternatively, the trademark or logo can be place next to the data matrix code.

Examples

The release liner of a bulk roll of an automotive window film product approximately 2000 yards in length and 60 inches wide was printed with unique identifying marks during the manufacturing process. The release liner was printed using an ink jet printer (Linx 7900) and the unique identifying marks were in the form of rectangular two dimensional (2-D) data matrix codes.

Figure 4:
FIG. 4 is an illustration of a section of a 60 inch wide bulk film roll showing the arrangement of unique identifying marks.

Referring to FIG. 4, the unique identifying marks were printed in three lanes oriented with the machine axis of the bulk roll. In FIG. 4, each "X" represents a unique identifying mark. The middle lane of unique identifying marks was printed 3 inches to the right of the center of the roll, and the outer two lanes were each offset from the center of the roll by 17 inches. The unique identifying marks measured about 0.25 by 0.50 inches, and were printed 54 inches apart in their respective lanes. The unique identifying marks in the middle lane were offset 18 inches in the machine direction from those in the left lane, and those in the right lane were offset 18 inches from those in the middle lane, forming a repeating staggered pattern. The horizontal axis of FIG. 4 is in inches. The vertical axis represents the machine axis of the bulk roll and is not to scale.

After manufacture, the bulk film roll was divided into sections of 100 feet in length and 60 inches wide. Each section of film roll had about 67 unique identifying marks printed on the release liner. These film roll sections were wrapped around cores that had unique identifying marks affixed to them. These cores wrapped with film were individually packaged in boxes that also had unique identifying marks affixed to them. Lastly, 36 of the boxed rolls were loaded onto a pallet which had a unique identifying mark affixed to the pallet load ticket. Identifying marks on the liners, cores, boxes, and pallet ticket were successfully scanned.

The identifying mark on the pallet load ticket was linked to each identifying mark on the labels of the 36 boxes on the pallet. Each identifying mark on a box label was also linked to the identifying mark on the pallet ticket. Each roll of film had about 67 identifying marks that were linked to its respective core, box, and pallet identifying marks.

The identifying marks were evaluated for their ability to be scanned successfully by electronic handheld devices and cause the device to connect to an internal website. Printed identifying marks were successfully scanned with various camera devices including hand-held scanners from Motorola, Honeywell, Cognex, and Microscan. Online scanners such as those available from Cognex were also successfully used to scan the printed identifying marks. The printed identifying marks were successfully scanned by mobile devices, including most major brands of "smart phones" including Samsung, Apple, Motorola, HTC, LG, Blackberry, Nokia, Huawei, and Xiaomi. The printed identifying marks were successfully scanned with an Apple iPad4 tablet computer and a Toshiba Thrive (Android) tablet computer.

Exemplary Embodiments

1. A parent film comprising:
   one or more layers, and
   a plurality of identifying marks,
   wherein the parent film has a width and length,
   wherein each of the plurality of identifying marks are different from each other,
   wherein the identifying marks are located on the parent film across the width of the parent film and across the length of the parent film, and
   wherein the parent film can be subdivided into one or more child films, each having a smaller surface area than the parent film.
2. The parent film according to any of the preceding embodiments directed to parent films, wherein the parent film is subdivided to produce a first child film and the child film becomes a second parent film that can be subsequently subdivided into one or more child films.
3. The parent film according to any of the preceding embodiments directed to parent films, wherein each identifying mark in the parent film is associated with information stored in a database capable of uniquely identifying the child film containing the identifying mark.
4. The parent film according to any of the preceding embodiments directed to parent films, wherein each identifying mark in the parent film is associated with information stored in a database capable of uniquely identifying the child film containing the identifying mark and wherein the information stored in the database comprises information chosen from: date of manufacture of the parent film, location of manufacture of the parent film, lot number for the parent film, packaging and shipping information for the parent film (including information identifying the core of the roll containing the parent film, the packaging box where the parent film was shipped, and the pallet where the parent film was shipped), invoice information, and combinations thereof
5. The parent film according to any of the preceding embodiments directed to parent films, wherein at least one of the identifying marks on the parent film has a parent-child relationship with identifying markings on the film roll cores, boxes, and pallets.
6. The parent film according to any of the preceding embodiments directed to parent films, wherein each of the identifying marks is a matrix data code.
7. The parent film according to any of the preceding embodiments directed to parent films, wherein each of the identifying marks is chosen from 1-D data matrix codes and 2-D data matrix codes.
8. The parent film according to any of the preceding embodiments directed to parent films, wherein each of the identifying marks is a rectangular data matrix code.

9. The parent film according to any of the preceding embodiments directed to parent films, wherein each of the identifying marks is a square data matrix code.
10. The parent film according to any of the preceding embodiments directed to parent films, wherein each of the identifying marks is a matrix data code and the matrix data code comprises non-informational markings.
11. The parent film according to any of the preceding embodiments directed to parent films, wherein the identifying mark is a 2-D data matrix code contained within a graphic image.
12. The parent film according to any of the preceding embodiments directed to parent films, wherein the identifying mark is incorporated into a logo or trademark.
13. The parent film according to any of the preceding embodiments directed to parent films, wherein film is a window film.
14. The parent film according to any of the preceding embodiments directed to parent films, wherein film is a non-woven fiber web.
15. The parent film according to any of the preceding embodiments directed to parent films, wherein film is a tape.
16. The parent film according to any of the preceding embodiments directed to parent films, wherein film is multi-layer composite film.
17. The parent film according to any of the preceding embodiments directed to parent films, wherein film comprises a liner.
18. The parent film according to any of the preceding embodiments directed to parent films, wherein the film comprises a liner and the plurality of identifying marks are printed on the outside surface of the liner.
19. The parent film according to any of the preceding embodiments directed to parent films, wherein the film comprises a liner and the plurality of identifying marks are printed on the inside surface of the liner.
20. The parent film according to any of the preceding embodiments directed to parent films, wherein the film comprises a liner and wherein the plurality of identifying marks are printed on the outermost layer opposite the liner.
21. The parent film according to any of the preceding embodiments directed to parent films, wherein the plurality of identifying marks are printed on a surface of a layer that becomes an interior surface of the film (i.e. the printed surface is not an exposed surface).
22. The parent film according to any of the preceding embodiments directed to parent films, wherein the film comprises a liner, wherein the plurality of identifying marks are printed on the outermost layer opposite the liner, and wherein the liner is removable.
23. The parent film according to any of the preceding embodiments directed to parent films, wherein the identifying mark are removable.
24. The parent film according to any of the preceding embodiments directed to parent films, wherein the identifying mark are removable by the use of a soapy solution or an organic solvent.
25. The parent film according to any of the preceding embodiments directed to parent films, wherein the identifying marks are permanently affixed to the film and cannot be removed without altering the article.
26. The parent film according to any of the preceding embodiments directed to parent films, wherein the parent film is subdivided at its manufacturing location to make a child film of known dimensions.
27. The parent film according to any of the preceding embodiments directed to parent films, wherein the parent film is subdivided at a distributor location to make a child film of known dimensions.
28. The parent film according to any of the preceding embodiments directed to parent films, wherein the parent film is subdivided at a customer location to make a child film of known dimensions.
29. The parent film according to any of the preceding embodiments directed to parent films, wherein the identifying marks are printed on an adhesive layer, which bonds the film to a substrate.
30. The parent film according to any of the preceding embodiments directed to parent films, wherein the identifying marks are printed by continuous inkjet printing.
31. The parent film according to any of the preceding embodiments directed to parent films, wherein the identifying marks are printed by piezo inkjet printing.
32. The parent film according to any of the preceding embodiments directed to parent films, wherein the identifying marks are printed by thermal transfer printing.
33. The parent film according to any of the preceding embodiments directed to parent films, wherein the identifying marks are printed by thermal inkjet printing.
34. The parent film according to any of the preceding embodiments directed to parent films, wherein the identifying marks can be scanned with a mounted in-line scanning device.
35. The parent film according to any of the preceding embodiments directed to parent films, wherein the identifying marks can be scanned with a hand-held scanning device.
36. The parent film according to any of the preceding embodiments directed to parent films, wherein the identifying marks can be scanned with mobile device having a camera.
37. The parent film according to any of the preceding embodiments directed to parent films, wherein the identifying marks can be scanned with mobile device having a camera, wherein the mobile device is chosen from cellular phones and tablets.
38. A tracking system comprising:
   a parent film comprising:
      one or more layers,
      a plurality of identifying marks,
   wherein the parent film has a width and length,
   wherein each of the plurality of identifying marks are different from each other,
   wherein the identifying marks are located on the parent film across the width of the parent film and across the length of the parent film, and
   wherein the parent film can be subdivided into one or more child films, each having a smaller surface area than the parent film, and
   a database comprising stored information on each of the plurality of identifying marks,
   wherein the stored information for each identifying mark is sufficient to uniquely identify each child film on which the identifying mark is located,
   wherein the stored information for each identifying mark is sufficient to associate each child film with the parent film.
39. The tracking system according to any of the preceding embodiments directed to tracking systems, wherein the parent film is subdivided to produce a first child film and the child film becomes a second parent film that can be subsequently subdivided into one or more child films.

40. The tracking system according to any of the preceding embodiments directed to tracking systems, wherein each identifying mark in the parent film is associated with information stored in a database capable of uniquely identifying the child film containing the identifying mark.
41. The tracking system according to any of the preceding embodiments directed to tracking systems, wherein each identifying mark in the parent film is associated with information stored in a database capable of uniquely identifying the child film containing the identifying mark and wherein the information stored in the database comprises information chosen from: date of manufacture of the parent film, location of manufacture of the parent film, lot number for the parent film, packaging and shipping information for the parent film (including information identifying the core of the roll containing the film, the packaging box where the parent film was shipped, and the pallet where the parent film was shipped), invoice information, and combinations thereof.
42. The tracking system according to any of the preceding embodiments directed to tracking systems, wherein at least one of the identifying marks on the parent film has a parent-child relationship with identifying markings on the film roll cores, boxes, and pallets.
43. The tracking system according to any of the preceding embodiments directed to tracking systems, wherein each of the identifying marks is a matrix data code.
44. The tracking system according to any of the preceding embodiments directed to tracking systems, wherein each of the identifying marks is chosen from 1-D data matrix codes and 2-D data matrix codes.
45. The tracking system according to any of the preceding embodiments directed to tracking systems, wherein each of the identifying marks is a rectangular data matrix code.
46. The tracking system according to any of the preceding embodiments directed to tracking systems, wherein each of the identifying marks is a square data matrix code.
47. The tracking system according to any of the preceding embodiments directed to tracking systems, wherein each of the identifying marks is a matrix data code and the matrix data code comprises non-informational markings.
48. The tracking system according to any of the preceding embodiments directed to tracking systems, wherein the identifying mark is a 2-D data matrix code contained within a graphic image.
49. The tracking system according to any of the preceding embodiments directed to tracking systems, wherein the identifying mark is incorporated into a logo or trademark.
50. The tracking system according to any of the preceding embodiments directed to tracking systems, wherein film is a window film.
51. The tracking system according to any of the preceding embodiments directed to tracking systems, wherein film is a non-woven fiber web.
52. The tracking system according to any of the preceding embodiments directed to tracking systems, wherein film is a tape.
53. The tracking system according to any of the preceding embodiments directed to tracking systems, wherein film is multi-layer composite film.
54. The tracking system according to any of the preceding embodiments directed to tracking systems, wherein film comprises a liner.
55. The tracking system according to any of the preceding embodiments directed to tracking systems, wherein film comprises a liner and the plurality of identifying marks are printed on the outside surface of the liner.
56. The tracking system according to any of the preceding embodiments directed to tracking systems, wherein film comprises a liner and the plurality of identifying marks are printed on the inside surface of the liner.
57. The tracking system according to any of the preceding embodiments directed to tracking systems, wherein film comprises a liner and wherein the plurality of identifying marks are printed on the outermost layer opposite the liner.
58. The tracking system according to any of the preceding embodiments directed to tracking systems, wherein the plurality of identifying marks are printed on a surface of a layer that becomes an interior surface of the film (i.e. the printed surface is not an exposed surface).
59. The tracking system according to any of the preceding embodiments directed to tracking systems, wherein film comprises a liner, wherein the plurality of identifying marks are printed on the outermost layer opposite the liner, and wherein the liner is removable.
60. The tracking system according to any of the preceding embodiments directed to tracking systems, wherein the identifying mark are removable.
61. The tracking system according to any of the preceding embodiments directed to tracking systems, wherein the identifying mark are removable by the use of a soapy solution or an organic solvent.
62. The tracking system according to any of the preceding embodiments directed to tracking systems, wherein the identifying marks are permanently affixed to the film and cannot be removed without altering the article.
63. The tracking system according to any of the preceding embodiments directed to tracking systems, wherein the parent film is subdivided at its manufacturing location to make a child film of known dimensions.
64. The tracking system according to any of the preceding embodiments directed to tracking systems, wherein the parent film is subdivided at a distributor location to make a child film of known dimensions.
65. The tracking system according to any of the preceding embodiments directed to tracking systems, wherein the parent film is subdivided at a customer location to make a child film of known dimensions.
66. The tracking system according to any of the preceding embodiments directed to tracking systems, wherein the identifying marks are printed on an adhesive layer, which bonds the film to a substrate.
67. The tracking system according to any of the preceding embodiments directed to tracking systems, wherein the identifying marks are printed by continuous inkjet printing.
68. The tracking system according to any of the preceding embodiments directed to tracking systems, wherein the identifying marks are printed by piezo inkjet printing.
69. The tracking system according to any of the preceding embodiments directed to tracking systems, wherein the identifying marks are printed by thermal transfer printing.
70. The tracking system according to any of the preceding embodiments directed to tracking systems, wherein the identifying marks are printed by thermal inkjet printing.
71. The tracking system according to any of the preceding embodiments directed to tracking systems, wherein the identifying marks can be scanned with a mounted in-line scanning device.
72. The tracking system according to any of the preceding embodiments directed to tracking systems, wherein the identifying marks can be scanned with a hand-held scanning device.

73. The tracking system according to any of the preceding embodiments directed to tracking systems, wherein the identifying marks can be scanned with mobile device having a camera.
74. The tracking system according to any of the preceding embodiments directed to tracking systems, wherein the identifying marks can be scanned with mobile device having a camera, wherein the mobile device is chosen from cellular phones and tablets.
75. A method for authenticating a film comprising:
    providing a parent film,
        wherein the parent film comprises:
            one or more layers,
            a plurality of identifying marks,
        wherein the parent film has a width and length,
        wherein each of the plurality of identifying marks are different from each other,
        wherein the identifying marks are located on the parent film across the width of the parent film and across the length of the parent film,
        wherein the parent film is subdivided into one or more child films, each having a smaller surface area than the parent film, and
        wherein the child film has at least one identifying mark.
    providing a database,
        wherein the database comprises stored information on a plurality of authentic identifying marks,
        wherein the stored information for each identifying mark is sufficient to uniquely identify a child film on which the identifying mark is located,
        wherein the stored information for each identifying mark is sufficient to associate a child film with its parent film, and
    verify that one or more identifying marks on the child film is an authentic identifying mark.
76. The method according to any of the preceding embodiments directed to methods, wherein the parent film is subdivided to produce a first child film and the child film becomes a second parent film that can be subsequently subdivided into one or more child films.
77. The method according to any of the preceding embodiments directed to methods, wherein each identifying mark in the parent film is associated with information stored in a database capable of uniquely identifying the child film containing the identifying mark.
78. The method according to any of the preceding embodiments directed to methods, wherein each identifying mark in the parent film is associated with information stored in a database capable of uniquely identifying the child film containing the identifying mark and wherein the information stored in the database comprises information chosen from: date of manufacture of the parent film, location of manufacture of the parent film, lot number for the parent film, packaging and shipping information for the parent film (including information identifying the core of the roll containing the film, the packaging box where the parent film was shipped, and the pallet where the parent film was shipped), invoice information, and combinations thereof
79. The method according to any of the preceding embodiments directed to methods, wherein at least one of the identifying marks on the parent film has a parent-child relationship with identifying markings on the film roll cores, boxes, and pallets.
80. The method according to any of the preceding embodiments directed to methods, wherein each of the identifying marks is a matrix data code.
81. The method according to any of the preceding embodiments directed to methods, wherein each of the identifying marks is chosen from 1-D data matrix codes and 2-D data matrix codes.
82. The method according to any of the preceding embodiments directed to methods, wherein each of the identifying marks is a rectangular data matrix code.
83. The method according to any of the preceding embodiments directed to methods, wherein each of the identifying marks is a square data matrix code.
84. The method according to any of the preceding embodiments directed to methods, wherein each of the identifying marks is a matrix data code and the matrix data code comprises non-informational markings.
85. The method according to any of the preceding embodiments directed to methods, wherein the identifying mark is a 2-D data matrix code contained within a graphic image.
86. The method according to any of the preceding embodiments directed to methods, wherein the identifying mark is incorporated into a logo or trademark.
87. The method according to any of the preceding embodiments directed to methods, wherein film is a window film.
88. The method according to any of the preceding embodiments directed to methods, wherein film is a non-woven fiber web.
89. The method according to any of the preceding embodiments directed to methods, wherein film is a tape.
90. The method according to any of the preceding embodiments directed to methods, wherein film is multi-layer composite film.
91. The method according to any of the preceding embodiments directed to methods, wherein film comprises a liner.
92. The method according to any of the preceding embodiments directed to methods, wherein film comprises a liner and the plurality of identifying marks are printed on the outside surface of the liner.
93. The method according to any of the preceding embodiments directed to methods, wherein film comprises a liner and the plurality of identifying marks are printed on the inside surface of the liner.
94. The method according to any of the preceding embodiments directed to methods, wherein film comprises a liner and wherein the plurality of identifying marks are printed on the outermost layer opposite the liner.
95. The method according to any of the preceding embodiments directed to methods, wherein film comprises a liner and wherein the plurality of identifying marks are printed on a surface of a layer that becomes an interior surface of the film (i.e. the printed surface is not an exposed surface).
96. The method according to any of the preceding embodiments directed to methods, wherein film comprises a liner, wherein the plurality of identifying marks are printed on the outermost layer opposite the liner, and wherein the liner is removable.
97. The method according to any of the preceding embodiments directed to methods, wherein the identifying mark are removable.
98. The method according to any of the preceding embodiments directed to methods, wherein the identifying mark are removable by the use of a soapy solution or an organic solvent.
99. The method according to any of the preceding embodiments directed to methods, wherein the identifying marks are permanently affixed to the film and cannot be removed without altering the article.

100. The method according to any of the preceding embodiments directed to methods, wherein the parent film is subdivided at its manufacturing location to make a child film of known dimensions.
101. The method according to any of the preceding embodiments directed to methods, wherein the parent film is subdivided at a distributor location to make a child film of known dimensions.
102. The method according to any of the preceding embodiments directed to methods, wherein the parent film is subdivided at a customer location to make a child film of known dimensions.
103. The method according to any of the preceding embodiments directed to methods, wherein the identifying marks are printed on an adhesive layer, which bonds the film to a substrate.
104. The method according to any of the preceding embodiments directed to methods, wherein the identifying marks are printed by continuous inkjet printing.
105. The method according to any of the preceding embodiments directed to methods, wherein the identifying marks are printed by piezo inkjet printing.
106. The method according to any of the preceding embodiments directed to methods, wherein the identifying marks are printed by thermal transfer printing.
107. The method according to any of the preceding embodiments directed to methods, wherein the identifying marks are printed by thermal inkjet printing.
108. The method according to any of the preceding embodiments directed to methods, wherein the identifying marks can be scanned with a mounted in-line scanning device.
109. The method according to any of the preceding embodiments directed to methods, wherein the identifying marks can be scanned with a hand-held scanning device.
110. The method according to any of the preceding embodiments directed to methods, wherein the identifying marks can be scanned with mobile device having a camera.
111. The method according to any of the preceding embodiments directed to methods, wherein the identifying marks can be scanned with mobile device having a camera, wherein the mobile device is chosen from cellular phones and tablets.

We claim:
1. A parent film comprising:
a. one or more layers including a removable liner, and
b. a plurality of identifying marks,
wherein the parent film has a width and length,
wherein each of the plurality of identifying marks are different from each other,
wherein the identifying marks are located on the parent film across the width of the parent film and across the length of the parent film,
wherein each of the identifying marks is printed on an adhesive layer bonding the removable liner to the parent film, the identifying marks disposed at regular intervals along the length of the parent film, the identifying marks being scannable through the removable liner,
wherein each of the identifying marks is chosen from a one-dimensional matrix data code and a two-dimensional matrix data code, and
wherein the parent film is subdivided into one or more child films, each having a smaller surface area than the parent film.
2. The parent film according to claim 1, wherein the parent film is subdivided to produce a first child film and the first child film becomes a second parent film that is subsequently subdivided into one or more child films.
3. The parent film according to claim 1, wherein each identifying mark of the plurality of identifying marks in the parent film is associated with stored information capable of uniquely identifying at least one child film of the one or more child films containing the identifying mark.
4. The parent film according to claim 1, wherein each identifying mark of the plurality of identifying marks in the parent film is associated with stored information capable of uniquely identifying at least one child film of the one or more child films containing the identifying mark and wherein the stored information comprises information chosen from: date of manufacture of the parent film, location of manufacture of the parent film, lot number for the parent film, packaging and shipping information for the parent film, information identifying a core of a roll containing the parent film, a packaging box where the parent film was shipped, and a pallet where the parent film was shipped, invoice information, and combinations thereof.
5. The parent film according to claim 4, wherein at least one of the identifying marks of the plurality of identifying marks on the parent film has a parent-child relationship with identifying markings on at least one of a film roll core, a box, and a pallet.
6. The parent film according to claim 4, wherein each of the identifying marks of the plurality of identifying marks is a matrix data code.
7. The parent film according to claim 4, wherein the parent film is a window film.
8. The parent film according to claim 4, plurality of identifying marks are printed on an outside surface of the removable liner.
9. A tracking system comprising:
a. a parent film comprising:
one or more layers including a removable liner,
a plurality of identifying marks,
wherein the parent film has a width and length,
wherein each of the plurality of identifying marks is different from each of the other identifying marks of the plurality of identifying marks,
wherein the plurality of identifying marks are located on the parent film across the width of the parent film and across the length of the parent film, wherein each of the plurality of identifying marks is printed on an adhesive layer bonding the removable liner to the parent film, the identifying marks disposed at regular intervals along the length of the parent film, the identifying marks being scannable through the removable liner,
wherein each of the plurality of identifying marks is chosen from a one-dimensional matrix data code and a two-dimensional matrix data code, and
wherein the parent film is subdivided into one or more child films, each having a smaller surface area than the parent film, and
b. stored information on each of the plurality of identifying marks,
wherein the stored information for each of the plurality of identifying marks is sufficient to uniquely identify each child film on which the identifying mark is located,
wherein the stored information for each of the plurality of identifying marks is sufficient to associate each child film with the parent film.
10. The tracking system according to claim 9, wherein the parent film is subdivided to produce a first child film and the first child film becomes a second parent film that is subsequently subdivided into one or more child films.

11. The tracking system according to claim 9, wherein each of the plurality of identifying marks in the parent film is associated with stored information capable of uniquely identifying at least one child film from the one or more child films containing the identifying mark.

12. A method for authenticating a film comprising:
a. providing a parent film,
b. wherein the parent film comprises:
   one or more layers,
   a plurality of identifying marks,
   wherein the parent film has a width and length,
   wherein each of the plurality of identifying marks are different from each other,
   wherein each of the plurality of identifying marks is printed on an adhesive layer bonding the parent film to a removable liner, the identifying marks disposed across the width of the parent film and across the length of the parent film, the identifying marks being scannable through the removable liner,
   wherein the parent film is subdivided into one or more child films, each having a smaller surface area than the parent film, and wherein each child film has at least one identifying mark,
c. providing stored information on a plurality of authentic identifying marks, wherein the stored information for each of the plurality of identifying marks is sufficient to uniquely identify a first child film of the one or more child films on which at least one identifying mark of the plurality of identifying marks is located,
   wherein the stored information for the at least one identifying mark is sufficient to associate the first child film with the parent film, and
d. verifying that the at least one identifying mark on the first child film is properly linked to the parent film.

13. The method according to claim 12, wherein the parent film is subdivided to produce a first child film and the first child film becomes a second parent film that is subsequently subdivided into one or more child films.

14. The method according to claim 12, wherein each of the plurality of identifying marks in the parent film is associated with stored information capable of uniquely identifying at least one child film of the one or more child films containing the identifying mark.

15. The method according to claim 12, wherein each of the plurality of identifying marks in the parent film is associated with stored information capable of uniquely identifying the child film containing the identifying mark and wherein the stored information comprises information chosen from: date of manufacture of the parent film, location of manufacture of the parent film, lot number for the parent film, packaging and shipping information for the parent film, information identifying a core of a roll containing the parent film, a packaging box where the parent film was shipped, and a pallet where the parent film was shipped, invoice information, and combinations thereof.

* * * * *

UNITED STATES PATENT AND TRADEMARK OFFICE
CERTIFICATE OF CORRECTION

PATENT NO. : 10,891,878 B2
APPLICATION NO. : 15/761459
DATED : January 12, 2021
INVENTOR(S) : Ron Thery et al.

Page 1 of 1

It is certified that error appears in the above-identified patent and that said Letters Patent is hereby corrected as shown below:

In the Specification

Column 8
Line 52, delete "thereof" and insert -- thereof. --, therefor.

Column 13
Line 59, delete "thereof" and insert -- thereof. --, therefor.

In the Claims

Column 16
Line 31, in Claim 8, before "plurality" insert -- wherein the --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*